Patented July 16, 1935

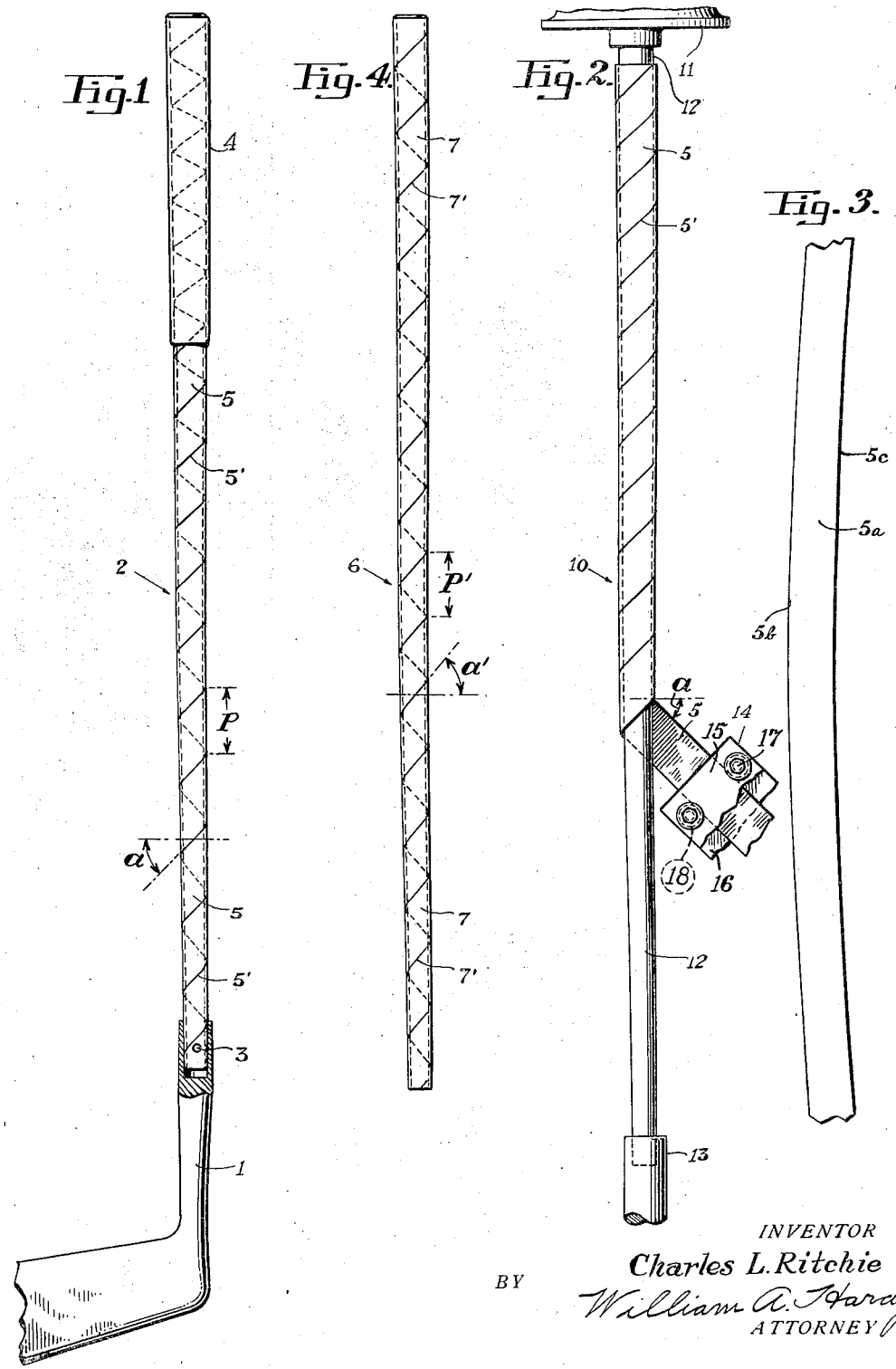

2,008,423

UNITED STATES PATENT OFFICE 2,008,423

HOLLOW SHAFT

Charles L. Ritchie, Paterson, N. J., assignor to Wiley W. McMinn, Orange, N. J.

Application December 10, 1934, Serial No. 756,887
In Great Britain November 16, 1931

22 Claims. (Cl. 273—80)

This application is a continuation in part replacing my copending application Serial No. 495,904, filed November 15, 1930.

The present invention relates to hollow tubular members and has particular reference to members of this kind which are wholly or in part tapered. Members of this kind are particularly suitable for use as shafts for golf clubs and for the purpose of explaining and illustrating the invention I have shown in the accompanying drawing two embodiments of the invention as applied to golf club shafts. It is to be understood, however, that the invention is not limited in its application to shafts of this character, but includes hollow tubular members generally.

In accordance with the present invention I provide a hollow tubular member having longitudinal taper by winding, as by twisting, turning and/or rolling, a long strip of suitable metal into helical or spiral form so as to produce a hollow structure having substantially the desired tapered form of the finished product and with the outer surface of the convolutions of such structure substantially in a common conical or like surface of revolution and with the edge portions of adjacent convolutions in abutting relation.

The structure thus formed is then made into an integral member by welding or otherwise fixedly securing together the abutting edge portions of adjacent convolutions and the member may then be finished by grinding and/or polishing operations for removing surface irregularities resulting from the welding or other fixing operation, and such surface imperfections as may be present in the material employed.

In producing hollow members embodying the invention, the strip of which the member is formed may be either of uniform width or it may be tapered, and in the accompanying drawing forming a part of this specification I have illustrated hollow members made from both kinds of strip.

In the drawing, Fig. 1 shows partly in elevation and partly in section a golf club having a shaft embodying the invention and made from a strip of uniform width;

Fig. 2 is a more or less diagrammatic view of apparatus adapted to be used in producing tubular members embodying the invention, and illustrates such apparatus in use in forming a shaft from a strip of metal of uniform width;

Fig. 3 is a development showing a portion of the strip from which the shaft in Fig. 1 is formed and illustrates the deformation occurring in a strip of uniform width when it is made into a tapered shaft; and Fig. 4 is a view in elevation of a tapered shaft embodying the invention and made from a strip of metal of uniformly tapering width.

Considering first the form of the invention in which the hollow member or shaft is made from a strip of metal of uniform width, and with particular reference to Figs. 1 to 3, inclusive, of the drawing, the golf club shown in Fig. 1 comprises a striking head 1, a hollow tapering shaft 2 of suitable metal, having its smaller end portion firmly secured, as by a rivet 3 or other suitable means, within the usual socket provided in the shank of head 1, and a conventional grip 4 applied to the larger end portion of the shaft and which may be formed of leather strips and/or other material wound on the shaft and suitably secured together and to the shaft. The improved shaft of the club is made from a single thin narrow strip 5, which is much longer than the shaft and which is formed of a suitable ductile material, preferably unhardened or only partially tempered spring steel. This is done by spirally winding such strip about an axis transverse of and oblique with respect to the length of the strip as fed and the strip is wound through or into a plurality of turns of helical form to thereby produce a series of contiguous convolutions forming a straight hollow member. The opposed or abutting edge portions of the strip at the spiral joint between adjacent convolutions of the hollow member are then integrally or fixedly secured together while maintaining such edge portions close together. Preferably the said opposed edge portions are integrally or fixedly secured throughout the entire length of the spiral joint 5, and such edge portions are preferably so secured together by autogenous welding through the use of suitable electric welding apparatus. Subsequent to the fixing of such opposed or abutting edge portions the member is then tempered and where a smooth or polished surface is desired for the finished article the member is finally finished by grinding and/or polishing operations for removing the surface roughness occasioned by the welding or other fixing operation, and also such surface imperfections as there may be in the material of the strip from which the member is formed.

The hollow member formed as just described should, of course, be tapered substantially in conformity with the desired taper of the finished shaft 2 produced therefrom by the tempering and finishing operations. This may be, and for the purpose of economy in production, preferably is, accomplished by employing a strip of uniform width, although this necessitates progressively increasing the pitch of the strip, that is, the axial length per convolution, indicated at P in Fig. 1, from the larger to the smaller end of the hollow tapered member upon forming the latter. When the strip is wound with increasing pitch in forming said hollow member, the adjacent abutting or opposing edge portions of the strip at the spiral joint 5', unless provision is made for counteracting the same, will tend to spread apart at intervals and to project outwardly the one past the other in progressive amounts toward the smaller end of such member. I have found that it is possible readily to produce from a ductile metal strip of uniform width (e. g. the strip 5), such a hollow tapering member in which the opposed edges of the strip at the spiral joint 5' are disposed in close abutting relation throughout the length of such joint and without either of said edges projecting radially outward past the other a material amount at any point, by winding the strip closely onto a suitably tapered mandrel or arbor and subjecting the strip to sufficient tension as it is being wound onto the mandrel from the larger toward the smaller end of the latter, to effect a slight but progressively increasing deformation thereof. Means whereby this may be accomplished are illustrated in Fig. 2, wherein reference character 10 designates apparatus having a rotatable head or chuck 11 in which one end of a long tapering mandrel or arbor 12 is secured and also having a bearing 13 in which the other end of said mandrel is journalled. Associated with the tapering mandrel 12 is a suitable strip tensioning and feeding device indicated generally at 14. This device may be of any suitable form providing a tension feed for the metal. The apparatus shown in the drawing more or less diagrammatically by way of example comprises clamping plates or jaws 15 and 16 between which the strip 5 is drawn by rotation of the mandrel 12. The desired tension of the strip in the feeding operation is effected by friction due to the pressure of the clamping jaws on the strip. In the construction illustrated the jaws 15 and 16 are held together by bolts 17 passing through suitable openings in the jaws at either side of the strip, and the desired amount of clamping pressure may advantageously be obtained by suitable springs 18 disposed between the heads of the bolts and one of the clamping jaws, such for example as the jaw 15. With this arrangement the tension of the feed can be varied as desired by varying the compression of the springs due to turning up the securing nuts for the bolts to a greater or lesser degree.

It will be evident that the tension feeding device must be moved lengthwise of the shaft as the strip is wound on the mandrel, and as will readily be understood this may advantageously be accomplished by mounting the clamping jaws on a suitable traveling carriage (not shown) similar to the tool-holding carriage of a lathe.

In the use of said apparatus to produce a hollow tapering member such as just described from the strip 5 of uniform width, said strip is spirally wound onto mandrel 12 from the larger toward the smaller end of the mandrel as the latter is rotated, by feeding the strip to the mandrel from the device 14, while the latter is caused to move lengthwise of the mandrel at the proper relative speed, at such a rate and under such tension that the strip will be progressively deformed as above described and caused closely and uniformly to engage the mandrel with the opposing edges of its convolutions in close abutting relation throughout the length of the spiral joint 5'. The opposing edge portions at the joint 5' may then be welded together, after which the hollow tapering shaft or member thus produced may be removed from the mandrel and be subjected to the necessary heat-treating and finishing operations to produce the finished shaft 2.

The deformation of a strip of uniform width to produce a hollow tapering member as described, occurs longitudinally of the strip, one edge of the strip being lengthened somewhat relative to the opposite edge of the strip. This deformation is illustrated in Fig. 3, which shows a section 5a of a shaft similar to that of the club shown in Fig. 1, such section being untwisted and flattened out to show the permanent deformation of the strip due to such lengthening of one edge 5b of the strip relative to the opposite edge 5c.

When a hollow tubular member is formed from a strip of uniform width as herein described, the successive convolutions of the strip will occupy progressively greater space, measured longitudinally of the shaft, toward the smaller end of the shaft, or to put it in another way, the pitch and also the pitch angle a of the spiral joint 5' will progressively increase from the larger toward the smaller end of the shaft (see Figs. 1 and 2).

The pitch angle a is the angle included between a plane normal to the longitudinal axis of the member and a line tangent to the spiral joint or coinciding with the edge of the strip as fed.

For the production of a hollow tapering shaft or tubular member such as shaft 6 shown in Fig. 4, there may also be employed, if desired, a long metal strip of uniformly tapering width. It will be evident that a shaft of given taper can be made from tapering strips of different mean or average width, and it will further be evident that to produce a shaft of given taper the amount of taper of the strip from which the shaft is formed will vary with variations in the mean width of the strip, the taper increasing with increase in the mean width and decreasing with decrease of the mean width. Also, it will be evident that for a strip of given mean or average width the amount of taper of the strip required to form a shaft having convolutions with abutting edges will vary with the amount of taper of the shaft, the amount of taper of the strip increasing with increase in the amount of taper of the shaft and decreasing with decrease in the amount of taper of the shaft. When a properly tapered strip is spirally wound as described to form a hollow tapering member, the opposed edges at the spiral joint 7' will be brought into abutting relation without either of said edges projecting outward past the other a material amount at any point and without permanent longitudinal deformation of the strip.

In a member formed from a properly tapered strip, the pitch P' (Fig. 4) will be substantially uniform from end to end of the tapered portion, but due to the decrease in diameter of the member from the larger to the smaller end, the pitch angle a' will increase from the larger to the smaller end.

A hollow tapering member of the kind shown in Fig. 4 may conveniently be produced by using the apparatus shown in Fig. 2, and except for the deformation of the strip, may be produced in a manner similar to that hereinbefore described in connection with the production of a hollow member from a strip of uniform width, while tempering and finishing operations in the present instance may be substantially identical with those hereinbefore described.

It is advantageous in making the shafts for some of the golf clubs produced, to employ therefor strips which vary in thickness and which preferably are of uniformly increasing thickness from one end to the other, so as to thereby obtain shafts having the resiliency and "whip" or "snap" demanded by different players. This is so either when the strips employed are of uniform width as shown in Figs. 1 and 2, or of tapering width as shown in Fig. 4.

In finished golf club shafts or other tubular members produced as herein described the spiral joints are usually not readily discernible and accordingly do not have an unusual appearance.

Golf club shafts or other hollow tubular members produced in accordance with the present invention provide substantial advantages as compared with similar articles produced by methods heretofore employed. Since the grain of the metal in the spirally twisted strip of a shaft or other hollow member produced in accordance with the invention follows the convolutions of the strip, or in other words is disposed spirally about the axis of such shaft or other member, the latter will offer a substantially uniform resistance to bending stresses regardless of the direction in which they may be applied. The strength of the member when made in accordance with the present invention is such that the thickness of the stock employed and the consequent weight of the member need not be greater than in golf club shafts and other hollow members as now made, and may be even thinner and lighter, and the manufacture of such members in accordance with the present invention is much cheaper than the methods now employed, which require swedging or like operation in order to produce a tapered shaft.

While in order to comply with the patent statutes with respect to illustration of my invention I have described it in its application to the production of golf club shafts, it will be understood that the invention is not limited to this specific article, but is to be understood as embracing everything falling within the scope of the appended claims when they are construed as broadly as is consistent with the state of the art.

What I claim is:

1. A shaft for golf clubs comprising a hollow member, said member consisting of a spirally twisted long metal strip of varying width in the direction of its length with opposed edge portions of its convolutions secured together, said strip increasing in thickness substantially from one end to the other thereof.

2. A shaft for golf clubs comprising a hollow member, said member consisting of a spirally twisted long metal strip of uniformly tapering width and uniformly varying thickness substantially from one end to the other thereof, the opposed edges of the convolutions of said member being secured together.

3. A shaft for golf clubs comprising a hollow tapering member consisting of a long narrow metal strip of substantially uniform width spirally twisted about an axis transverse to its length through a plurality of turns into hollow form and having adjacent convolutions secured positively and fixedly together.

4. A golf club comprising a striking head and a hollow tapering shaft fixedly secured at its smaller end to said head, said shaft consisting of a single metal strip of substantially uniform width and of materially greater length than the shaft spirally twisted through a plurality of turns extending in one direction axially of the shaft substantially into the tapering form of the shaft, adjacent convolutions of said shaft being secured directly and fixedly together.

5. A golf club comprising a striking head and a hollow tapering shaft fixedly secured at its smaller end to said head, said shaft consisting of a single long metal strip of substantially uniform width spirally twisted through a plurality of turns substantially into the tapering form of the shaft, adjacent edge portions of adjoining convolutions of said shaft being secured together and said convolutions increasing in pitch from the larger to the smaller end of the shaft.

6. A golf club comprising a striking head and a hollow tapering shaft fixedly secured at its smaller end to said head, said shaft consisting of a single long metal strip of substantially uniform width and thickness spirally twisted through a plurality of turns substantially into the tapering form of the shaft, the adjacent edge portions of adjoining convolutions of said shaft being fixedly secured together and the successive convolutions increasing substantially uniformly in pitch from the larger to the smaller end of the shaft.

7. A hollow tapering shaft for golf clubs formed of a long metal strip, said strip being spirally twisted through a plurality of turns substantially into the form of the shaft and having opposed edge portions of adjacent convolutions secured together, the said convolutions increasing in pitch from the larger to the smaller end of the shaft.

8. A hollow tapering shaft for golf clubs formed of a long metal strip of substantially uniform width and thickness, said strip being spirally twisted through a plurality of turns substantially into the form of the shaft and having the adjacent edge portions of its convolutions fixedly secured together, the successive convolutions of the strip increasing substantially uniformly in pitch from the larger to the smaller end of the shaft.

9. A hollow tapering shaft for golf clubs formed of a long metal strip, said strip being spirally twisted through a plurality of turns substantially into the form of the shaft and having opposed edge portions of adjacent convolutions secured together, the convolutions of the smaller end portion of the shaft being greater in pitch than those of the larger end portion of the shaft.

10. A hollow tapering shaft for golf clubs formed of a long metal strip, said strip being spirally twisted through a plurality of turns into a member substantially of the form of the shaft, said member having opposed edge portions of adjacent convolutions thereof secured together, the pitch of the convolutions decreasing from the smaller towards the larger end of the shaft for at least a portion of the length of the shaft.

11. A golf club comprising a head and a tubular shaft formed from a strip of uniform width spirally wound through a plurality of turns extending in one direction axially of the shaft, certain convolutions being formed and arranged to produce a tapered portion of the shaft, and adjoining convolutions being positively connected together.

12. A shaft for golf clubs comprising a tubular member formed of a long strip of uniform width spirally wound through a plurality of turns about an axis transverse to its length, certain convolutions being formed and arranged to produce a tapered portion of the shaft, the adjacent edge portions of the convolutions being positively connected together, said member intermediate the joints of its convolutions being formed of but a single thickness of said strip.

13. A tubular tapering shaft for golf clubs formed of a long metal strip, said strip being spirally wound through a plurality of turns about an axis transverse to its length, adjacent edge portions of adjoining convolutions being secured together, the pitch of the convolutions increasing towards the smaller end of the shaft for at least a portion of the length of the shaft, said shaft intermediate the joints of its convolutions being formed of but a single thickness of said strip.

14. A golf club comprising a head and a tubular shaft secured to said head, said shaft being formed from a long metal strip spirally wound through a plurality of turns extending in one direction axially of the shaft, certain convolutions of said strip being formed and arranged to produce a tapered portion of the shaft, and adjoining convolutions of said strip being positively secured together.

15. A golf club comprising a head and a tubular shaft secured to said head, said shaft being formed from a long metal strip of varying width spirally wound through a plurality of turns extending in one direction axially of the shaft, certain convolutions of said strip being formed and arranged to produce a tapered portion of the shaft, and adjoining convolutions of said strip being positively secured together.

16. A tubular member having a tapered portion, said member being formed from a long metal strip spirally wound through a plurality of turns extending in one direction axially of such member, certain successive convolutions of said strip being progressively deformed to produce the said tapered portion of the tubular member, and adjoining convolutions of said strip being positively secured together.

17. A golf club comprising a head and a tapered tubular shaft secured to said head, said shaft being formed from a long metal strip spirally wound through a plurality of turns extending in one direction axially of the shaft, the successive convolutions of said strip being formed and arranged to produce the tapered tubular shaft and with their adjacent edge portions in opposed and substantially abutting relation, said opposed edge portions being positively secured together.

18. A golf club comprising a head and a tapered tubular shaft secured to said head, said shaft being formed from a long metal strip of varying width spirally wound through a plurality of turns extending in one direction axially of the shaft, the successive convolutions of said strip being formed and arranged to produce the tapered tubular shaft and with their adjacent edge portions in opposed and substantially abutting relation, said opposed edge portions being positively secured together.

19. A tapered tubular member, said member being formed from a long metal strip of uniform width spirally wound through a plurality of turns extending in one direction axially of the shaft, the successive convolutions of said strip being formed and arranged to produce the tapered tubular member and with their adjacent edge portions in opposed and substantially abutting relation, said opposed edge portions being positively secured together.

20. A tubular member having a tapered portion, said member being formed from a long metal strip spirally wound through a plurality of turns extending in one direction axially of said member, the metal of the convolutions of said strip in the tapered portion of said member being deformed longitudinally of the strip to produce said tapered portion of the tubular member and the edges of adjacent convolutions of said strip being positively secured together.

21. A tubular member having a tapered portion, said member being formed from a long metal strip spirally wound through a plurality of turns extending in one direction axially of said member, the metal of the convolutions of said strip in the tapered portion of said member being deformed longitudinally of the strip so that one edge of said strip is longer than the opposite edge of said strip along a given number of said convolutions, whereby to produce said tapered portion of said member with convolutions having edges in abutting relation, the abutting edges of adjacent convolutions of said strip being positively secured together.

22. A tubular member comprising a tapered portion formed from a long metal strip of substantially uniform width spirally wound into a plurality of turns to provide a series of contiguous convolutions, the metal of the strip forming said convolutions being deformed to compensate for the difference in diameter of adjacent convolutions and to bring the opposed edge portions of adjacent convolutions into substantially even and continuous abutting relation and said edge portions being permanently secured together.

CHARLES L. RITCHIE.